United States Patent [19]
Lee

[11] Patent Number: 6,019,002
[45] Date of Patent: Feb. 1, 2000

[54] PRESSURE TRANSDUCER HAVING A TENSIONED DIAPHRAGM

[75] Inventor: Shih-Ying Lee, Lincoln, Mass.

[73] Assignee: Setra Systems, Inc., Boxboro, Mass.

[21] Appl. No.: 08/982,708

[22] Filed: Dec. 2, 1997

[51] Int. Cl.[7] .................................................. G01L 9/12
[52] U.S. Cl. ........................................ 73/724; 361/283.4
[58] Field of Search .................. 73/724, 718; 361/283.4

[56] References Cited

U.S. PATENT DOCUMENTS

| | | | |
|---|---|---|---|
| 3,793,885 | 2/1974 | Frick | 73/398 C |
| 4,158,311 | 6/1979 | Yasuhara et al. | 73/718 |
| 4,265,389 | 5/1981 | Mastromatteo | 228/219 |
| 4,823,603 | 4/1989 | Ferran et al. | 73/724 |
| 5,442,962 | 8/1995 | Lee | 73/718 |

*Primary Examiner*—Joseph L. Felber
*Attorney, Agent, or Firm*—Lappin & Kusmer LLP

[57] ABSTRACT

A capacitive pressure transducer includes a conductive diaphragm positioned between pneumatically separated chambers. The diaphragm is fixed and sealingly coupled at its periphery to the peripheral rim of a concave body member. The diaphragm is supported in tension by the peripheral rim of the body member. An electrode assembly, supported by the body member establishes a substantially planar conductive surface opposite to and spaced apart by a nominal gap from the conductive diaphragm. The body member includes a yieldable portion that is adapted to radially expand its peripheral rim in response to forces applied to the body member. When the forces are applied, the body member becomes strained beyond its elastic limit and takes a permanent set whereby the peripheral rim is expanded and the diaphragm becomes tensioned. The tension in the diaphragm can be determined as a function of the geometry of the body member and deformation resulting from the forces applied. Additional forces can be applied at a later point in time in order to change or adjust the tension in the diaphragm.

19 Claims, 7 Drawing Sheets

PRESSURE TRANSDUCER HAVING A TENSIONED DIAPHRAGM

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

This invention relates to capacitive pressure transducers having a stationary electrode and a movable diaphragm and, more particularly, to a capacitive pressure transducer having a tensioned diaphragm.

Capacitive pressure sensors typically include a stationary electrode having a rigid, planar conductive surface forming one plate of a substantially parallel plate capacitor and a deformable conductive member, such as a metal foil diaphragm, which forms the other plate of the capacitor. Generally, the diaphragm is edge-supported, having a central portion that is movable and positioned substantially parallel to and opposite the fixed plate. Since the sensor generally has the form of a parallel plate capacitor, the characteristic capacitance of the sensor is inversely proportional to the gap, d, between the central portion of the diaphragm and the conductive surface of the stationary electrode. In order to provide a pressure differential across the diaphragm, the region on one side of the diaphragm is sealed or pneumatically separated from the region on the opposite side.

In practice, the geometry and physical characteristics of the diaphragm are selected so that the pressure differentials across the diaphragm in a particular range of interest cause predetermined displacements of the central portion of the diaphragm. These pressure differential-induced displacements result in corresponding variations in the gap, d, between the two capacitor plates (i.e. the electrode and the diaphragm), and thus in capacitance variations produced by the transducer. For relatively high sensitivity, such transducers require large changes of capacitance in response to relatively small pressure changes.

Figure 1A:
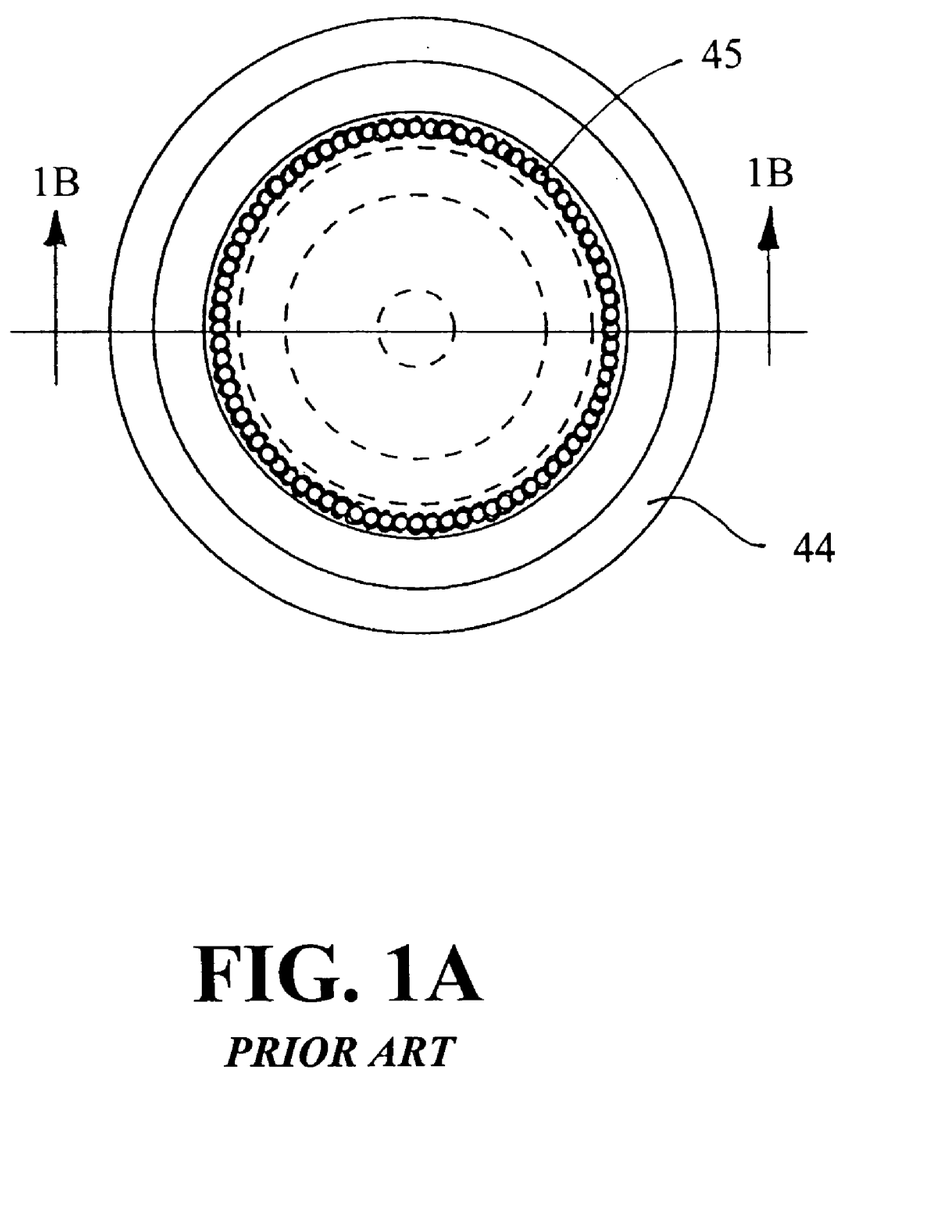
FIGS. 1A and 1B show a prior art configuration for a capacitive pressure transducer with a tensioned diaphragm.
Figure 1B:
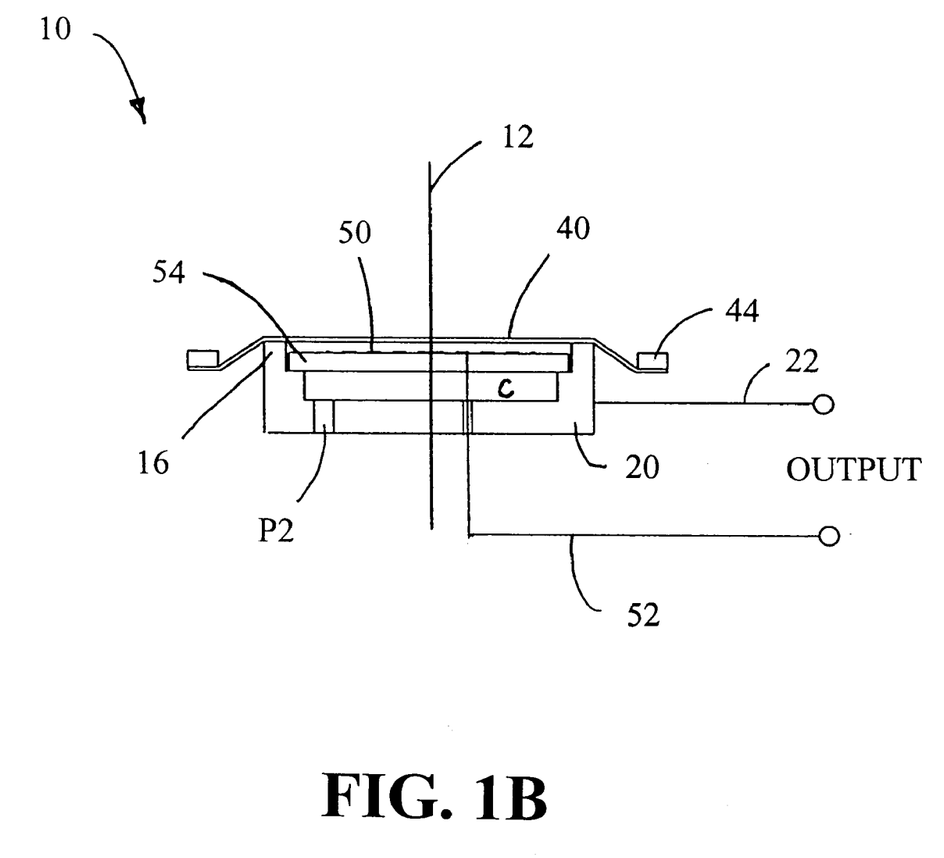

One type of pressure transducer includes a tensioned diaphragm that is peripherally supported by the peripheral rim of a concave body member of the transducer. This type of pressure transducer is difficult and expensive to manufacture because the manufacturing process requires that the diaphragm be maintained in tension while it is secured to the body member. FIGS. 1A and 1B show one method of fastening a diaphragm under tension to a single concave body member. One way of effecting this method includes fastening the diaphragm to a stretching frame and pressing the frame over the peripheral rim of the concave body member in order to create the appropriate tension. The stretched diaphragm is then fastened to the peripheral portion of the concave body. However, the diaphragm under tension cannot be fastened by a continuous weld since during the welding process, the tension in the central portion releases as the welded portion melts. One method of fastening the stretched diaphragm to the single concave body member is to apply a sequence of overlapping spot welds so that upon completion, overlapping spot welds fasten the diaphragm to the concave body member and create a seal. The peripheral portion of the diaphragm that extends beyond the concave body member would be removed after welding. Alternatively, the diaphragm could be held in place with a plurality of tack welds distributed along the peripheral rim of the concave body member and a continuous weld could be applied to peripheral rim at a location outside of the tack welds to seal the diaphragm to the concave body member. However, these methods are not capable of producing a pressure transducer that includes a pair of concave body members because spot welding does not effectively secure the two concave body members together with the diaphragm in between and the additional heat required produce a continuous weld between the two concave body members (which are typically 100 to 200 times the thickness of the diaphragm) would cause the portion of the diaphragm tack welded to one of the concave body members to melt releasing the tension in the diaphragm.

This method has many disadvantages. The diaphragm has to be oversized and thus some of the material is wasted. The process requires the precursor step of fastening the oversized diaphragm to the stretching frame. The overlapping spot welding process used to secure the diaphragm to the concave body member is labor intensive and time consuming. Finally, further processing is required to remove the excess diaphragm after welding.

Accordingly, it is an object of the present invention to provide an improved method of producing a pressure transducer.

Another object of the present invention is to provide an improved pressure transducer.

Yet another object of the present invention is to provide an improved pressure transducer that is relatively inexpensive and easy to manufacture.

Still another object of the present invention is to provide an improved pressure transducer having a tensioned diaphragm.

A fuirther object of the present invention is to provide an improved pressure transducer having a tensioned diaphragm in which the tension in the diaphragm can be adjusted.

A still further object of the present invention is to provide an improved pressure transducer having a suitable pressure port.

SUMMARY OF THE INVENTION

The present invention is directed to an improved capacitive pressure transducer, adapted for high accuracy measurement of pressure using a low cost, easily manufactured structure. The transducer includes an electrically conductive diaphragm or a diaphragm having an electrically conductive portion, supported in tension at its periphery by the peripheral rim of at least one concave body member. The region interior to the concave body member and bounded by a first side of the diaphragm creates a chamber that can be pneumatically isolated from the outer region of the body member. An electrode assembly can be rigidly coupled by way of an insulating material to the base member in order to establish a conductive surface opposite to, and spaced apart by a nominal gap from, the conductive diaphragm to form a parallel plate capacitor. The conductive surface of the electrode is preferably planar, but may differ slightly, for example, being substantially planar whereby a portion of the surface is slightly concave to match the anticipated deflections of the diaphragm in use.

In accordance with one embodiment of the invention, the capacitive pressure transducer includes a first concave body member and a second concave body member, each extending about a central axis and including a peripheral rim disposed in a first plane which is substantially perpendicular to the central axis. The capacitive pressure transducer also includes a diaphragm that spans the peripheral rim of at least one concave body member and has a peripheral portion that is fixedly and sealingly coupled to the peripheral rim of at least one concave body member. The diaphragm and the concave body member form a first chamber which can be hermetically sealed or pneumatically isolated from the outer region of the pressure transducer. A portion of the peripheral rim of the second concave body member can also be coupled to the peripheral portion of the diaphragm and/or the peripheral rim of the first concave body member forming a second chamber on the opposite side of the diaphragm with respect to the first chamber. The peripheral rims of each of the concave body members can include adjacent portions that are substantially congruent in the first plane A fastening method such as welding can be used to fixedly and sealingly fasten the peripheral portion of the diaphragm to the peripheral rim of one or both of the concave body members. Preferably, a continuous weld which extends along the entire peripheral portion of the rim of the pressure transducer is used to fasten congruent portions of the concave body members and the diaphragm together forming a seal that separates the first chamber from the second chamber. Each concave base member can include a pressure port to facilitate pressure measurement The pressure in the second chamber with respect to the pressure in the first chamber can be determined as a function of the capacitance at that pressure and the capacitance at a predefined initial pressure.

At least one of the concave body members can be constructed of a yieldable material or includes a portion constructed of a yieldable material. The concave body member can also be adapted to expand the peripheral rim, radially with respect to the central axis, in response to external forces (a force and a corresponding reaction force) applied to the body member in a direction parallel to the central axis. These forces will produce compressive and bending stresses in the concave body member. After the diaphragm is fastened to the concave body member, the concave body member is exposed to compressive and bending stresses sufficient to strain the concave body member beyond its elastic limit or yield point whereby the concave body achieves a permanent deformation or set. Preferably, these stresses are also sufficient to expand the peripheral rim of the concave body member to establish a tension in the diaphragm but do not cause the diaphragm to exceed its elastic limit. Alternatively, both of the concave body members can be formed of a yieldable material and adapted to radially expand their peripheral rims in response to the application of external forces (a force and a corresponding reaction force). In this embodiment, both concave body members and the diaphragm are fastened together and the assembly formed by the concave body members is exposed to compressive and bending stresses sufficient to strain the concave body members beyond their elastic limits whereby the concave body members achieve plastic deformation and permanent set and a tension is established in the diaphragm.

Preferably, the pressure transducer is constructed using a method whereby the diaphragm is securely fastened under little or no tension to the peripheral rim portion of one or both concave body members and a tension is established in the diaphragm by applying external forces to the transducer assembly (comprised of the diaphragm and both concave members) substantially perpendicular to the nominal plane of the diaphragm causing the peripheral rims of the concave body members to expand radially with respect to the central axis. The stresses generated by the external forces are sufficiently greater than the yield strength to cause the concave body member to yield permanently and to set in the expanded condition. Preferably, the forces are applied in a direction substantially perpendicular to the plane of the diaphragm causing the peripheral rim of the concave body members to expand radially with respect to the central axis.

The resulting tension in the diaphragm is created by the application of one or more forces (and corresponding reaction forces) on one or both of the concave body members. The amount of force that is applied can be predetermined either empirically or numerically calculated to establish the desired tension level in the diaphragm. Alternatively, the forces can be applied to one or both concave body members until one or both of the concave body members undergo a predefined change in one or more physical dimensions, such as the height or the diameter of the concave body member.

In an alternative embodiment, the capacitive pressure transducer can include a first concave body member extending about a central axis and having a peripheral rim disposed in a first plane, the first plane being substantially perpendicular to the central axis and an electrically conductive diaphragm or a diaphragm having an electrically conductive, displaceable portion. The diaphragm can include a peripheral portion sealingly coupled to the peripheral rim of the first concave body member by a continuous weld. The concave body member can be strained beyond its elastic limit or yield point whereby the peripheral rim of the concave body member is expanded and the diaphragm becomes tensioned. Subsequently, a second concave body member having a peripheral rim can be fastened to the peripheral portion of the diaphragm and the first concave body member.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

FIGS. 1A and 1B show a prior art capacitive pressure transducer 10 having a tensioned diaphragm 40. The capacitive pressure transducer 10 includes a sensor body 20 and a diaphragm 40 extending central axis 12. Diaphragm 40 is sealingly fastened in tension to body 20 by a plurality of overlapping spot welds 45 to the peripheral wall 16 of the sensor body 20. The capacitive pressure transducer 10 also includes an electrode 50 which is mounted to an insulating substrate 54 which is coupled to the sensor body 20. The substrate 54 electrically insulates the electrode 50 from the body 20 and conductor 52 is connected to electrode 50 to conduct the output through the body 20. Conductor 22 is coupled to the body 20 and the output of the capacitive pressure transducer is measured across conductor 52 and conductor 22. The sensor body 20 and the diaphragm 40 define a chamber C that can be isolated from the pressure on the outside of the diaphragm. Typically, a second sensor body (not shown) is fastened to the opposite side of the diaphragm from the first sensor body 20 and forms a second chamber (not shown). In this configuration, the transducer can be used to measure the pressure difference between the chambers on either side of the diaphragm. In addition, the capacitive pressure transducer 10 can include a pressure port P2 for coupling the pressure to be measured to the chamber C.

The diaphragm 40 is fastened to the sensor body 20 by a prior art process that involves several steps. First, an oversized diaphragm 40 is securely fastened to a stretching frame 44 having an inside diameter substantially larger than the outer diameter of the sensor body 20. Second, the stretching frame 44 is pressed over the peripheral wall 16 of the sensor body 20 and forced downward (as illustrated) in the direction of axis 12, creating a radially outward (from axis 12) tension in the diaphragm 40. Third, the diaphragm 40 is fastened to the sensor body 20 by a plurality of overlapping spot welds 45 that extend over the peripheral wall. Finally, the excess diaphragm material between the spot welds 45 and the stretching frame 44 is removed.

It is important to note that the number of possible methods of fastening the diaphragm 40 to the peripheral wall 16 is limited to those methods that will not cause the tension in the diaphragm 40 to be lost. For example, the diaphragm 40 cannot be fastened to the peripheral wall 16 by a continuous weld because the tension in the diaphragm 40 is lost as a result of the welding process. Similarly, other methods of fastening such as brazing and soldering are not acceptable because these processes heat the diaphragm causing it to expand whereby the tension in the diaphragm 40 does not remain after fastening.

Figure 2:
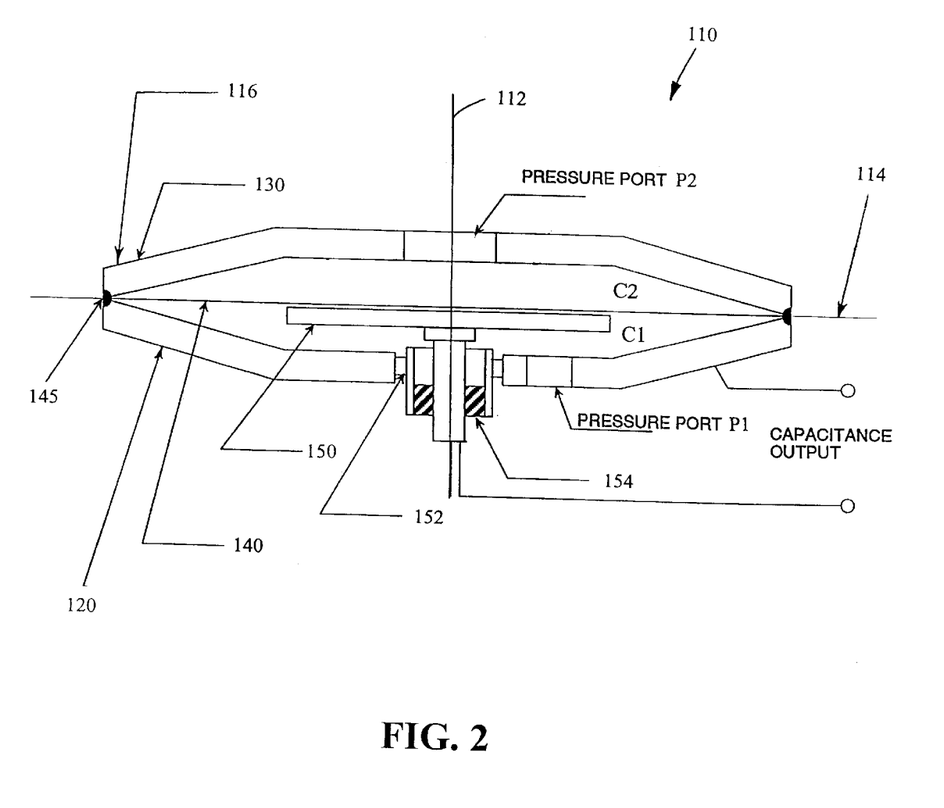
FIG. 2 shows a section view of a capacitive pressure transducer having a tensioned diaphragm in accordance with the present invention.

FIG. 2 shows a capacitive pressure transducer 110 in accordance with the present invention. The capacitive pressure transducer 110 includes a concave lower body member 120 disposed about a central axis 112, a concave upper body member 130 disposed about the central axis 112 and a tensioned diaphragm 140 disposed in a first plane 114. The peripheral rim of the lower body member 120 and, the peripheral rim of the upper body member 130 are substantially congruent and securely fastened to the peripheral edge of the diaphragm 140 preferably by welding 145 whereby the diaphragm spans the peripheral rims of each of the lower body member 120 and the upper body member 130. The resulting pressure transducer includes two chambers C1 and C2 that can be pneumatically separated from each other. The lower body member 120 and the upper body member 130 can each include a pressure port P1 and P2 respectively, which permit pressurization of chambers C1 and C2 respectively. Alternatively, either chamber can be pressurized to a predefined pressure or vacuum and sealed in order to enable the sealed chamber to serve as a reference pressure for performing absolute pressure measurement.

Preferably, the peripheral rim of the lower body member 120 and the peripheral rim of the upper body member 130 are securely fastened to opposite sides of the peripheral edge of the diaphragm by a continuous joint 145 such as a continuous weld or a continuous brazed or soldered joint. In accordance with the invention, the joint can be formed when the diaphragm is not under tension, preferably in a single pass whereby all three components are joined simultaneously.

The capacitive pressure transducer also includes an electrode 150 which is secured to the lower body member 120 but electrically insulated therefrom by insulating material 154. The electrode 150 together with the diaphragm 140 form a substantially parallel plate capacitor. The diaphragm 140 includes a portion that is elastically displaceable relative to the electrode 150 in response to changes in pressure in one chamber C2 with respect to the pressure in the other chamber C1. The diaphragm 140 can be conductive or have a conductive portion. The change in pressure can be determined as a function of the change in capacitance of the parallel plate capacitor formed by the diaphragm 140 and the electrode 150.

Figure 5:
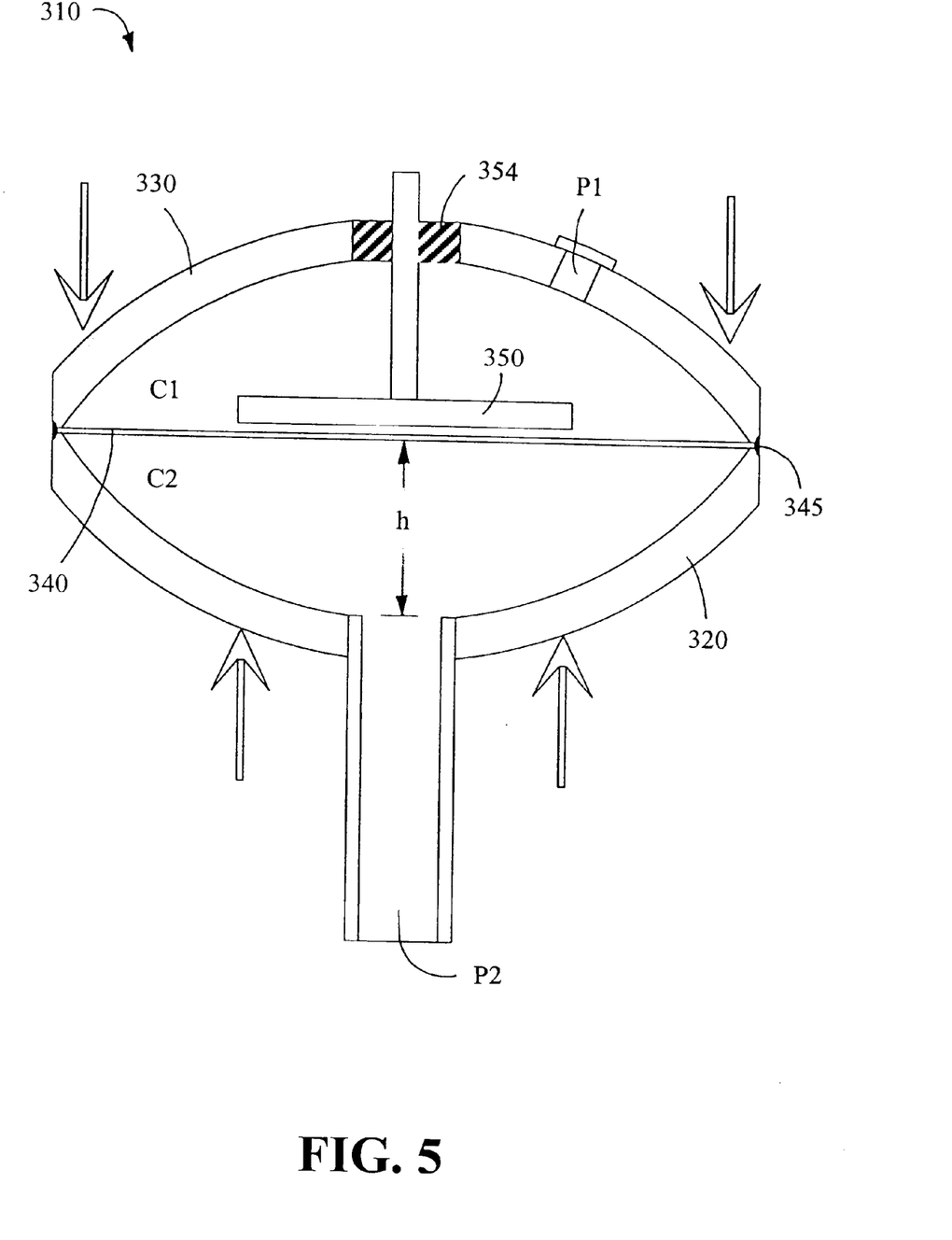
FIG. 5 shows a section view of an alternate capacitive pressure transducer in accordance with the present invention.

In the preferred embodiment, the lower body member 120 and the upper body member 130 are constructed of a yieldable or ductile material such as annealed 300 series stainless steel which can be strained beyond its elastic limit or yield point by the application of stresses to the body member exceeding the yield strength of the material whereby the body member attains a permanent set and remains in the deformed state after the stresses are removed. The diaphragm 140 is preferably formed from a material having a sufficiently high yield strength, such that when the concave body member is strained beyond its yield point, the tension established in the diaphragm does not strain the diaphragm beyond its elastic limit. In one preferred embodiment, the diaphragm is formed from hard rolled stainless steel having a thickness which is much less than that of body members 120 and 130, typically in the range of 0.0002 to 0.030 inches. For more sensitive pressure transducers, the diaphragm thickness can be as small as 0.0001 which is the practical limit. In one form, the electrode 150 is constructed as a separate assembly including a multiple element coupling that is rigidly secured to the lower body member 120 by a solder or adhesive 152 such as disclosed in U.S. Pat. No. 5,442,962, assigned to the assignee of the present invention, which is incorporated by reference herein. Alternatively, the electrode 150 can be pedestal mounted whereby the pedestal is directly fastened to the lower body member 120 by glass, epoxy or any other suitable insulating and sealing material as shown in FIG. 5.

Figure 3:
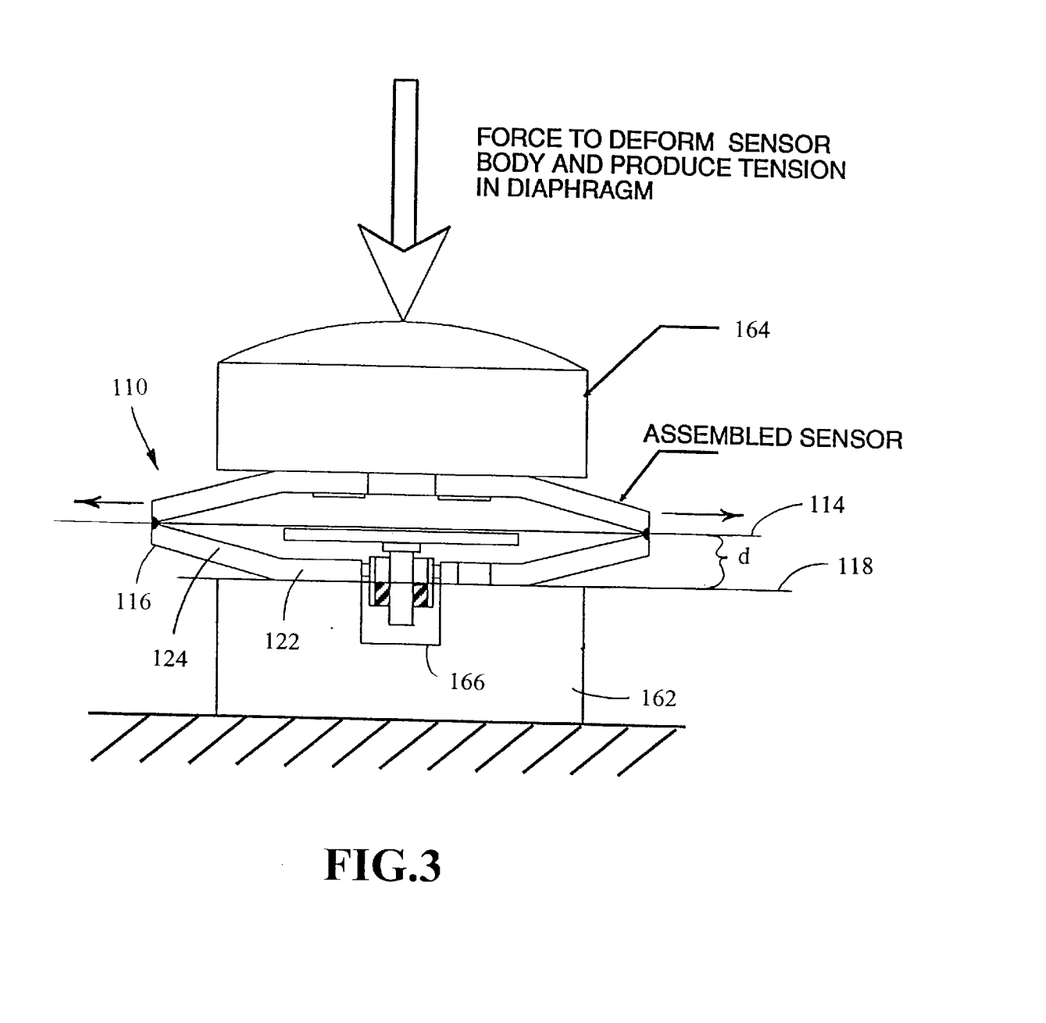
FIG. 3 shows a method of creating a tension in the diaphragm of a capacitive pressure transducer in accordance with the present invention.

In accordance with the invention, the diaphragm 140 of the capacitive pressure transducer is tensioned. The lower body member 120 and the upper body member 130 are each capable of taking a permanent set in response to an applied stress. As shown in FIG. 3, the structure of each of the lower body member 120 and the upper body member 130 is adapted to cause the peripheral rim 116 of the pressure transducer 110 to expand radially outwardly with respect to the central axis 112 in response to a force (and corresponding reaction force) applied to the pressure transducer 110 in a direction substantially perpendicular to the first plane 114 (the nominal plane of the diaphragm). Consequently, as the peripheral rim 116 is expanded outwardly about axis 112, the diaphragm 120 becomes tensioned.

In one preferred embodiment, each of the lower body member 120 and the upper body member 130 are substantially identical in shape. Preferably, each body member is round and includes a substantially planar base portion 122 extending in a second plane 118 and an angled portion 124 angled more than 0 degrees but less than 90 degrees with respect to the second plane 118. The angled portion 124 extends from the planar base portion 122 and terminates at the peripheral rim 116.

Alternatively, the upper and lower body members can be a different size and/or shape, such that the chamber formed by one body member can have a different volume than the chamber formed by the other body member. In addition, one or both of the body members can be formed in the shape of a portion of a hollow sphere or spheroid.

As shown in FIG. 3, the pressure transducer 110 can be positioned between pressing tool 162 and pressing tool 164, such as can be mounted in a hydraulic or pneumatic press (not shown) to provide the forces necessary to deform concave body members 120 and 130 and tension the diaphragm 140. Pressing tool 162 can include a recess 166 to accommodate the portion of the electrode 150 that extends through the lower concave body member 120. The force to be applied can be determined as a function of the construction and materials of the body members 120, 130 and the diaphragm 140 and desired tension of the diaphragm. In one preferred embodiment, where the body members are approximately 0.08 inches thick, the diaphragm is approximately 0.0003 inches thick and the pressure transducer 110 is approximately 1.6 inches in diameter and has a nominal distance d of 0.2 inches, the pressing tools apply a force of approximately 1000 pounds to obtain a tension in the diaphragm of approximately 10,000 psi. In this embodiment, the transducer has a 0.5 inch diameter electrode, a nominal gap between the electrode and the diaphragm of 0.005 inches with a maximum diaphragm deflection of 0.002 inches and can measure pressure down to 0.2 inches full scale.

Figure 4:
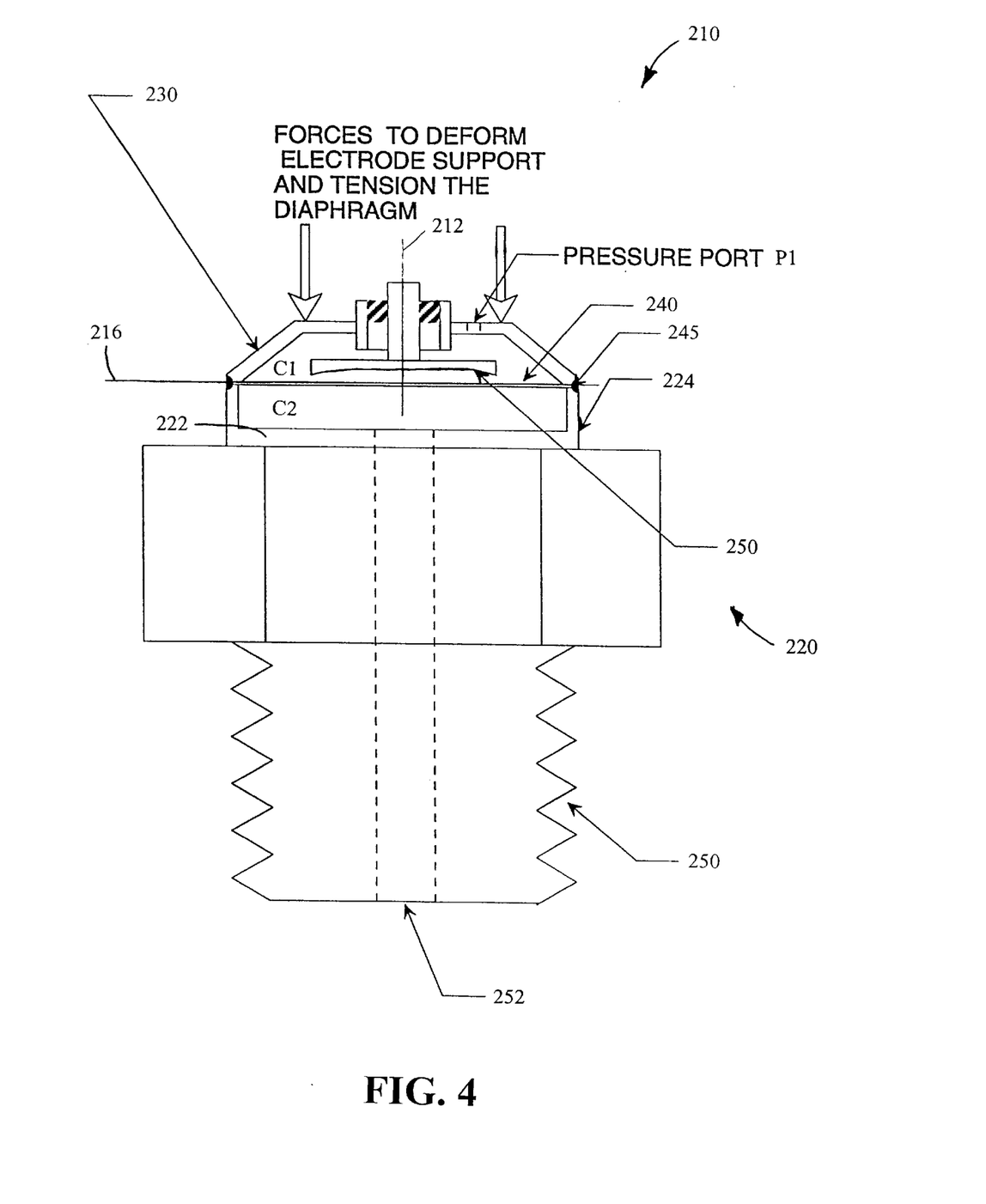
FIG. 4 shows a section view of an alternate capacitive pressure transducer in accordance with the present invention.

FIG. 4 shows a capacitive pressure transducer 210 in accordance with an alternative embodiment of the present invention. The capacitive pressure transducer 210 includes a concave lower body member 220 disposed about a central axis 212, a concave upper body member 230 disposed about the central axis 212 and a tensioned diaphragm 240 disposed in a first plane 216. The peripheral wall 224 of the lower body member 220, the peripheral rim of the upper body member 230 and the peripheral edge of the diaphragm 240 are securely fastened together, preferably by welding 245 whereby the diaphragm spans the peripheral rims of each of the lower body member 220 and the upper body member 230. The pressure transducer 210 defines two chambers C1 and C2 that can be pneumatically separated from each other. The upper body member 230 can include a pressure port P1 which permits the pressurization of chamber C1.

The upper body member 230 and electrode 250 are constructed in a manner similar to the upper body member and electrode shown in FIGS. 2 and 3, except that in FIG. 4 the surface of the electrode adjacent the diaphragm 240 and the first plane 216 is "substantially planar". As used herein, the term "substantially planar" surfaces is intended to include planar surfaces as well as surfaces that are slightly concave to accommodate the anticipated shape of the diaphragm as it is displaced in response the pressure differential between chamber C1 and chamber C2. All preferred forms of the invention could have this feature, but a strictly planar electrode 250 could be used as well. The upper body member 230 includes a portion that is adapted to cause the peripheral rim to expand in response to forces applied to the upper body member 230 in a direction substantially perpendicular to the plane of the diaphragm resulting in the diaphragm becoming tensioned. The lower body member 220, includes a side wall 224 extending substantially perpendicular to the substantially planar base portion 222. The side wall 224 of the lower body member 220 is also radially deformable in order to permit the diaphragm 240 to become tensioned. The lower body member 220 can further include a pressure fitting 250 having a pressure port 252 which permits the pressure transducer to be coupled to a source of pressure to be measured.

FIG. 5 shows an alternative preferred embodiment of a pressure transducer 310 that is useful for measuring absolute pressure and less effected by changes in the barometric pressure of the operating environment. In this embodiment, one of the chambers, C1 is sealed with a reference pressure such as absolute zero pressure inside and the pressure to be measured is applied to pressure port P2. One of the problems associated with measuring absolute pressure is that the outside or ambient pressure effects the accuracy of the pressure transducer. Typically, the ambient pressure can vary by as much as ±1.0 inch of mercury from day to day which can cause an error of as much as several percent full scale, depending on the configuration and material of the device. In order to reduce the effects of ambient pressure, the concave upper body member 330 and the lower concave body member 320 are formed in a domed shape and the walls of the concave body members is chosen to have sufficient thickness whereby changes in ambient pressure cause an insignificant change in the capacitance gap of the pressure transducer between the diaphragm 340 and the electrode 350. In the preferred embodiment, the height h, of each dome shaped concave body member 320, 330 is approximately one half the radius of the concave body member 320, 330 of the pressure transducer and the thickness of each concave body member 320, 330 is approximately one sixth the radius of the concave body member 320, 330. The upper concave body member 330 and the lower concave body member 320 and the diaphragm 340 are joined by a continuous weld 345 and electrode 350 is secured to upper concave body member 330 directly by insulating material 354. In other embodiments a multiple element coupling for electrode 350 can be used, such as that shown in the embodiment of FIG. 2. Similarly in the embodiments of FIGS. 2–4, a direct insulating material coupling can be used. In one exemplary embodiment, the radius of the concave body member 320, 330 is 0.7 inches, the height is 0.35 inches and the thickness is 0.125 inches. The reference chamber C1 is evacuated to a pressure of $10^{-6}$ torr and the port is sealed using an electron beam welding process. The resulting pressure transducer exhibits a variation of approximately 0.000002 inches of mercury or an error of about 0.01% for an ambient pressure variation of 2 inches of mercury which is acceptable for most applications.

Figure 6:
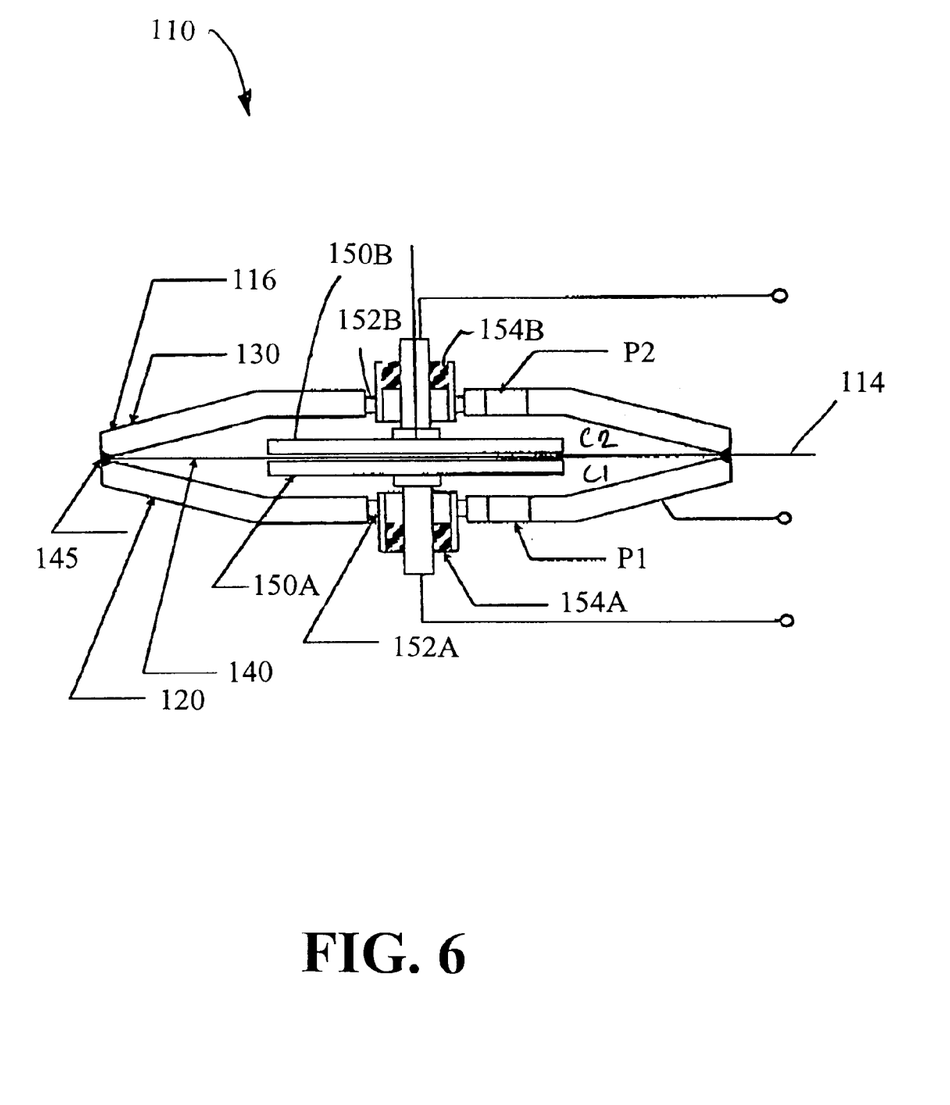
FIG. 6 shows a section view of an alternate capacitive pressure transducer in accordance with the present invention.

FIG. 6 shows a dual electrode embodiment of the invention suitable for use in "push-pull" sensing configuration, as shown in FIG. 4 of U.S. Pat. No. 5,442,962. In FIG. 6, elements corresponding to elements in the FIG. 2 embodiment are identified with the same reference designation. As shown in FIG. 6, there can be an electrode opposite the diaphragm in each of chambers C1 and C2.

In addition to the structure of the sensors 110, 210 and 310 as described above, an electronic circuit (not shown) which includes capacitance sensing instrumentation, such as disclosed in U.S. Pat. No. 4,054,833, may be integrally included with each sensor. The circuit can be positioned on a printed circuit board which is supported by base member 130, 230, 330 or by an external housing. The circuit can be connected to electrode 150, 250 and 350 through the support element via a spring contact extending from the circuit board.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A capacitive pressure transducer comprising:

a first concave body member defining a first interior region, a second concave body member defining a second interior region, a diaphragm fixedly and sealingly coupled to at least one of said concave body member and an electrode fixedly mounted to one of said concave body members and extending into said interior region defined by said concave body member;

said concave body members extending about a common central axis and each including a peripheral rim disposed in a first plane and having a portion congruent with a portion of the peripheral rim of the other concave body member, said diaphragm spanning the peripheral rim of at least one of said first concave body member and said second concave body member, said first plane being substantially perpendicular to said central axis, each of said concave body members including at least a portion that is yieldable and characterized by an elastic limit and being adapted for radially expanding said peripheral rim of said concave body member with respect to said central axis in response to forces applied to said body member, each of said concave body members including at least a portion that is strained beyond its elastic limit whereby said diaphragm is disposed under tension.

2. A capacitive pressure transducer according to claim 1 further comprising:

a continuous joint fixedly and sealingly coupling said diaphragm to at least one of said concave body members.

3. A capacitive pressure transducer according to claim 2 wherein said continuous joint includes a continuous weld which extends substantially over the length of the peripheral rim.

4. A capacitive pressure transducer according to claim 2 wherein said continuous joint includes a brazed joint which extends substantially over the length of the peripheral rim.

5. A capacitive pressure transducer according to claim 2 wherein said continuous joint includes a solder joint which extends substantially over the length of the peripheral rim.

6. A capacitive pressure transducer according to claim 1 wherein said electrode includes a pedestal fixedly mounted to one of said concave body members by an insulating material.

7. A capacitive pressure transducer according to claim 1 wherein at least one of said first concave body member and said second concave body member is formed from a sheet material characterized by a substantially uniform thickness.

8. A capacitive pressure transducer according to claim 7, wherein said at least one concave body member is stamped from a sheet material.

9. A capacitive pressure transducer according to claim 1 further comprising a second electrode fixedly mounted to another of said concave body members.

10. A capacitive pressure transducer comprising:

a first concave body member extending about a central axis and having a peripheral rim disposed in a first plane, said first plane being substantially perpendicular to said central axis, said first concave body member including a yieldable portion adapted for radially expanding said peripheral rim with respect to said central axis in response to forces applied to said first concave body member;

a second concave body member extending about said central axis and having a peripheral rim disposed in said first plane, said second concave body member including a yieldable portion adapted for radially expanding said peripheral rim with respect to said central axis in response to forces applied to said second concave body member;

a diaphragm spanning the peripheral rim of at least one of said first concave body member and said second concave body member, having a peripheral portion of a first side of said diaphragm fixedly coupled to the peripheral rim of said first concave body member whereby said diaphragm is nominally disposed in said first plane;

said first concave body member and said second concave body member being disposed on opposite sides of said diaphragm whereby at least a portion of the peripheral rim of said first concave base member and at least a portion of the peripheral rim of said second concave base member are substantially congruent and mutually joined; and an electrode fixedly coupled to one of said first concave body member and said second concave body member, including a substantially planar portion disposed opposite said diaphragm and extending substantially parallel to and spaced apart from said first plane;

said diaphragm being placed in tension by applying forces to said first concave body member and said second concave body member sufficient to cause both concave body members to strain beyond an elastic limit of each of said concave body members and to cause the peripheral rims of each of said concave body members to expand substantially radially with respect to said central axis.

11. A capacitive pressure transducer according to claim 10 wherein said forces are compressive forces applied in a direction substantially parallel to said central axis.

12. A capacitive pressure transducer according to claim 10 wherein said force applied to both of said concave body members is predefined whereby a predefined tension is created in said diaphragm.

13. A capacitive pressure transducer according to claim 10 wherein said first chamber is a hermetically sealed chamber having a predetermined pressure.

14. A capacitive pressure transducer made according to the method comprising the steps of:

A) providing a first concave body member extending about a central axis, and having a peripheral rim disposed in a first plane, said first plane being substantially perpendicular to said central axis, said first concave body member including at least a yieldable portion adapted for radially expanding said peripheral rim of said first concave body member with respect to said central axis in response to force applied to said first concave body member;

B) providing a diaiphragm having an electrically conductive portion;

C) providing an electrode fixedly coupled to said first concave body member and having a substantially planar portion opposite to and spaced apart from said first plane;

D) fixedly coupling a peripheral portion of said diaphragm to said peripheral rim of said first concave body member whereby said diaphragm is substantially without tension and positioned substantially in said first plane; and E) applying forces to said first concave body member whereby said concave body member is strained beyond an elastic limit of said concave body member and said peripheral rim becomes expanded whereby said diaphragm becomes tensioned.

15. A method of making a capacitive pressure transducer according to claim 14 wherein step A includes providing a second concave body member extending about said central axis, and having a peripheral rim disposed in said first plane and positioning a portion of said peripheral rim of said second concave body member in congruent relation with a portion of said peripheral rim of said first concave body member, said second concave body member including a yieldable portion adapted for radially expanding said peripheral rim of said second concave body member with respect to said central axis in response to a force applied to said second concave body members; and further comprising the steps of joining said congruent portions of said peripheral rims of said first concave body member and said second concave body member.

16. A method of making a capacitive pressure transducer according to claim 15 wherein step E includes applying forces to said second concave body member whereby said second concave body member is strained beyond an elastic limit of said second concave body member and said peripheral rim of said second concave body member becomes expanded whereby said diaphragm becomes tensioned.

17. A method of making a capacitive pressure transducer according to claim 14 wherein step E includes applying forces in a direction substantially parallel to said central axis.

18. A capacitive pressure transducer comprising a first concave body member defining an interior region, extending about a central axis, and having a peripheral rim disposed in a first plane, said first plane being substantially perpendicular to said central axis, said first concave body member including a portion formed from a yieldable material strained beyond an elastic limit of said yieldable material whereby said concave body member achieves plastic deformation and a permanent set;

an electrode fixedly coupled to first concave body member via an insulating material and extending into said interior region; and a diaphragm having an electrically conductive, displaceable portion disposed under tension, said diaphragm including a peripheral portion fixedly to said peripheral rim of said first body member whereby said diaphragm is disposed substantially in said first plane and forms a first chamber with said first body member.

19. A capacitive pressure transducer according to claim 18 wherein said concave body member further includes a deformable portion adapted for radially expanding said peripheral rim with respect to said central axis in response to a force applied to said body member whereby said diaphragm becomes tensioned.

* * * * *